United States Patent
Epars et al.

(10) Patent No.: US 9,844,294 B2
(45) Date of Patent: Dec. 19, 2017

(54) METHOD AND SYSTEM FOR DETERMINING THE CONSUMPTION BY AN INFANT OF BEVERAGES PRODUCED FROM CAPSULES IN A BEVERAGE PRODUCTION MACHINE

(71) Applicant: NESTEC S.A., Vevey (CH)

(72) Inventors: Yann Epars, Penthalaz (CH); Mark Shepherd, La Croix sur Lutry (CH); Florian Jacquier, Morristown, NJ (US); Daniel Roland Manser, Spiez (CH)

(73) Assignee: Nestec S.A., Vevey (CH)

( * ) Notice: Subject to any disclaimer, the term of this patent is extended or adjusted under 35 U.S.C. 154(b) by 24 days.

(21) Appl. No.: 14/450,398

(22) Filed: Aug. 4, 2014

(65) Prior Publication Data

US 2015/0037473 A1    Feb. 5, 2015

(30) Foreign Application Priority Data

Aug. 5, 2013  (EP) ..................................... 13179206

(51) Int. Cl.
| | |
|---|---|
| *A47J 31/44* | (2006.01) |
| *A47J 31/40* | (2006.01) |
| *G06Q 10/06* | (2012.01) |

(52) U.S. Cl.
CPC ......... *A47J 31/4492* (2013.01); *A47J 31/407* (2013.01); *G06Q 10/06* (2013.01); *G06Q 10/06315* (2013.01)

(58) Field of Classification Search
None
See application file for complete search history.

(56) References Cited

U.S. PATENT DOCUMENTS

| | | | | |
|---|---|---|---|---|
| 8,060,247 | B2 * | 11/2011 | Kaplan ................... | G07F 9/026 700/236 |
| 2005/0048461 | A1 * | 3/2005 | Lahteenmaki .......... | A61J 3/002 435/3 |
| 2005/0193901 | A1 * | 9/2005 | Buehler .................. | A47J 44/00 99/468 |
| 2011/0262601 | A1 * | 10/2011 | Manser ................... | A23L 1/296 426/231 |

(Continued)

FOREIGN PATENT DOCUMENTS

| | | | | |
|---|---|---|---|---|
| CH | WO 2011067232 A1 * | 6/2011 | ............. | G07F 9/026 |
| CH | WO-2011067232 A1 * | 6/2011 | ............. | G07F 9/026 |

(Continued)

*Primary Examiner* — Gene O Crawford
*Assistant Examiner* — Stephen L Akridge
(74) *Attorney, Agent, or Firm* — K&L Gates LLP (57) ABSTRACT

A system and method for determining the consumption by an infant of beverages produced from capsules in a beverage production machine. Capsule information regarding a plurality of different types of capsules is stored in a server. Further at least one user account including personal information about the infant consuming beverage produced from capsules is stored in said server. A beverage is produced from a capsule and the capsule used therefore by the beverage production machine is identified. The information on the identified capsule is transmitted to the server; such information including at least the date and time the beverage is prepared.

10 Claims, 10 Drawing Sheets

(56) References Cited

U.S. PATENT DOCUMENTS

| | | | | |
|---|---|---|---|---|
| 2012/0240781 A1* | 9/2012 | Delbreil | ............... | G07F 9/02 |
| | | | | 99/285 |
| 2013/0054257 A1* | 2/2013 | Holman | ............. | G07F 17/0064 |
| | | | | 705/2 |
| 2014/0134299 A1* | 5/2014 | Guidorzi | ................ | A47J 31/44 |
| | | | | 426/87 |
| 2015/0347713 A1* | 12/2015 | Seeger | ................ | A61J 7/0418 |
| | | | | 700/236 |
| 2016/0130068 A1* | 5/2016 | Epars | .................... | A47J 31/52 |
| | | | | 426/232 |

FOREIGN PATENT DOCUMENTS

| | | | | |
|---|---|---|---|---|
| CH | WO-2012062842 A1 * | 5/2012 | ............ | A47J 31/369 |
| WO | 2010003878 | 1/2010 | | |
| WO | 2012062842 | 5/2012 | | |
| WO | 2012104173 | 8/2012 | | |

\* cited by examiner

METHOD AND SYSTEM FOR DETERMINING THE CONSUMPTION BY AN INFANT OF BEVERAGES PRODUCED FROM CAPSULES IN A BEVERAGE PRODUCTION MACHINE

PRIORITY CLAIM

This application claims priority to European Application No. 13179206.1, filed Aug. 5, 2013, the entire contents of which are expressly incorporated herein by reference thereto.

BACKGROUND

The invention is directed to a method and a system for determining the consumption by an infant of beverages produced from capsules in a beverage production machine.

Recently it became more and more popular to prepare beverages like infant formula by use of production machines which make use of a capsule containing nutritional ingredients. By using capsules for containing nutritional ingredients it is possible to have a wide variety of different capsules in stock, thus, enabling a consumer to decide which beverages to be produced each time a capsule is inserted into the beverage production machine.

A beverage production machine and the corresponding capsule are known from WO2012/062842. The known system makes use of information which is provided on the capsule in order to determine a type of capsule which is used by the beverage production machine.

A problem may be that the machine can be used by different parents or caregivers. It is often difficult to ensure constantly accurate records of the consumption of beverages for a particular baby. A consumption tracking is generally important to ensure the baby is given the recommended intake, the right diet and/or to provide information to a pediatrician.

SUMMARY

Thus, it is an object of the invention to provide a method and system for assisting the user (e.g., parents) in determining automatically the consumption of beverages by an infant without need for the user to care about keeping track of the beverage consumption.

The problem is solved by the method and system according to the independent claims. The dependent claims further define the invention.

More particularly, the method of the invention is for determining the consumption by an infant of beverages produced from capsules in a beverage production machine and it comprises the steps of:
  a. Storing in a server at least one user account including personal information about the infant consuming the beverages produced from said capsules,
  b. Producing beverages from the capsules and identifying each capsule used therefore by the beverage production machine,
  c. Transmitting information on the identified capsule to the server including at least one time-related information when the capsule is identified by the machine,
  d. Making the consumption of beverages based on such information available under at least one application via a communication network on a user terminal.

Preferably, the consumption of beverages is made available in any one of the following application: a report, a graphic, a calendar, a text, a table and combinations thereof.

In a preferred example, the application, such as a calendar, is configured to show the number of meals (i.e., beverages) corresponding to the number of capsules identified.

The time related information can be a date (i.e., Day:Year) and/or time (i.e., Hour:Minute). This time-related information may vary depending on the application (e.g., whether it is a calendar or graphic).

On the server a user account is stored. This user account includes personal information about the baby which is consuming the beverages produced from the capsules. When the baby is fed with an infant formula produced from a capsule, the capsule used therefore is identified by the beverage production machine and the respective information is transmitted to the server. In the server now there is available the capsule information regarding the plurality of different types of capsules which are generally available and each of which is recommended for a particular age of the infant and on the other hand personal information about the baby is available as well as an information about the capsules which have already been used, i.e., identified as used in the machine. "Types" of the capsules may not only be divided with respect to the recommended age of the baby but may also indicate different tastes and/or recipes of the infant formula.

Preferably, the beverage production machine transmits information on the identified capsule each time a beverage is produced from said capsule. Automatically transmitting this information each time a beverage is produced keeps the data which is stored in the server up to date. In particular, the automatic transmission to the server ensures that no error can occur by the user who otherwise might forget to send the information to the server for example. As a result real time tracking of the consumption is also possible. In case, the server and/or network becomes unavailable, the beverage production machine is configured with storage means to store the information and delay the transmission of information when it becomes possible. This can be obtained by a memory and related program in the machine that is dedicated to store this information.

Advantageously, the server is hosted by the supplier of the capsules so that the information regarding the plurality of different types of capsules may always be kept up to date. In particular, new infant formulas might be offered by the supplier and due to the fact that the information is stored on the server any change may be taken into consideration immediately. This information is available for a plurality of user accounts. Each user account may be accessed by a consumer terminal of an account holder and is connected to the server via internet or a telecommunication network. The access is performed by logging in on a website and consequently the registered user account holder may access his account by any terminal which is available and capable of internet communication. Such terminals may for example be cell phones, tablet PCs, PCs, notebooks and the like. The advantage is that any information which is available from the user account may be accessed independently from the beverage production machine at anytime from anywhere.

In order to link the information of the identified used capsules to the baby, the beverage production machine is registered and assigned to a user account in the server. The user account may furthermore have other devices registered which are also capable of transmitting information to the server. By doing so it is possible to link information which is related to the consumption but also the development of the baby and make it accessible by use of a single account. This increases the comfort and the possibility to share information for example with a pediatrician.

It is furthermore preferred that the beverage production machine and/or the other devices are capable of determining internal parameters. Information on these parameters which might be the value of the parameter itself is then transmitted to the server. Such a transmission might either be performed regularly after constant time intervals or upon recognition of values being higher or lower than a predetermined threshold. The parameters which may be monitored are for example low rate, temperature or the like. The information on these parameters is then stored in the user account and accessible by the user. The user can thus keep himself informed about the current status of his used devices and may for example take maintenance measures in due time.

As an alternative to or in addition to the internal parameters external parameters may be determined and transmitted to the server. Such external parameter preferably is the weight of the baby and the other device is a weight scale which is also capable of internet communication.

By accessing the user account, the user may also receive an analysis on the stored internal parameters or measured and stored external parameters. Such an analysis may for example be a weight curve or statistics on used capsules. In that case the analysis is based on consumption data (consumption history) which is a result of the information regarding the type of capsule used which is transmitted each time a beverage is produced.

Although not particularly limited it is preferred that the communication between the server and beverage production machine and/or other devices is performed by using WiFi. The devices (including the beverage production machine) have for example a WiFi-card with an exclusive MAC address for identification of the device/machine.

It is furthermore preferred that in order to allow a perfect management of the stock that information on purchasing capsules is also stored in the user account and that this information on the amount of capsules still available to the user is also used as a basis for determination of a demand for replenishment. Thus, in case that the remaining capsules fall short of a predetermined threshold a demand for replenishment is determined. This demand which is determined may result in an automatic order which is generated electronically out of the user account or in an information presented to the user either in the account which is accessed by the user or by sending a notification such as an e-mail invitation to perform an ordering process. Alternatively the demand may be determined on the basis of the number of used capsules instead of the number of remaining capsules.

For performing the method, a system for determining the consumption information for capsules is used. This system comprises a beverage production machine, a remote server and means for determining at least one type of capsules used in the machine. The beverage production machine includes means for producing a beverage from a capsule and furthermore means for identifying a type of the capsule which is used for the current beverage production process.

Furthermore, the beverage production machine comprises means for transmitting information to a remote server. In a preferred embodiment this is realized by a WiFi interface or module.

The remote server on the other hand comprises a storage means where the user account is stored. The user account includes individual information about the consuming person, i.e. the baby for which infant formula is produced by the beverage production machine. Furthermore, the remote server comprises storage means for storing capsule information for a plurality of different types of capsules. This information preferably includes an identification of a particular type of capsule. The information may also include a recommendation for an age at which the infant formula produced therefrom should preferably be consumed.

The system further comprises means for generating a calendar showing the consumption of beverages and storage means making the calendar viewable by the user. The means for generating the calendar may further be configured to report the type of capsules which is identified, so directly related to beverage produced. Such additional information may be useful to provide a history of the feeding of the infant to eventually compare it to a recommended, standard or personalized feeding plan.

The system is furthermore configured such that user access is possible by a consumer terminal being connected to the server. Connection is preferably performed using the internet or a telecom network. In order to provide a single access to the user thereby enabling control of all devices including the beverage production machine used by the user the beverage production machine and/or at least one other device comprise at least one sensor for determining an internal parameter. Preferably, all parameters which are relevant for the production of the beverage or the use of the other device are monitored within the beverage production machine or the other device and are transmitted to the server in order to monitor the current status of the machine and recognize or anticipate machine failure. Information received from the production machine and/or the at least one other device are then stored in the server. In order to add information to the user account it is preferred that the at least one other device is capable of measuring an external parameter such as a weight of the baby and transmit an information on or the result itself to the server.

The server on the other hand includes means that is capable to perform an analysis on the data that is delivered from the beverage production machine and/or the other device. The result of the analysis can then be accessed from the user account.

BRIEF DESCRIPTION OF THE FIGURES

In the following the system and method are explained in greater detail with respect to a preferred embodiment illustrated in the drawing. The details will be explained referring to drawings in which.

DETAILED DESCRIPTION

Figure 1:
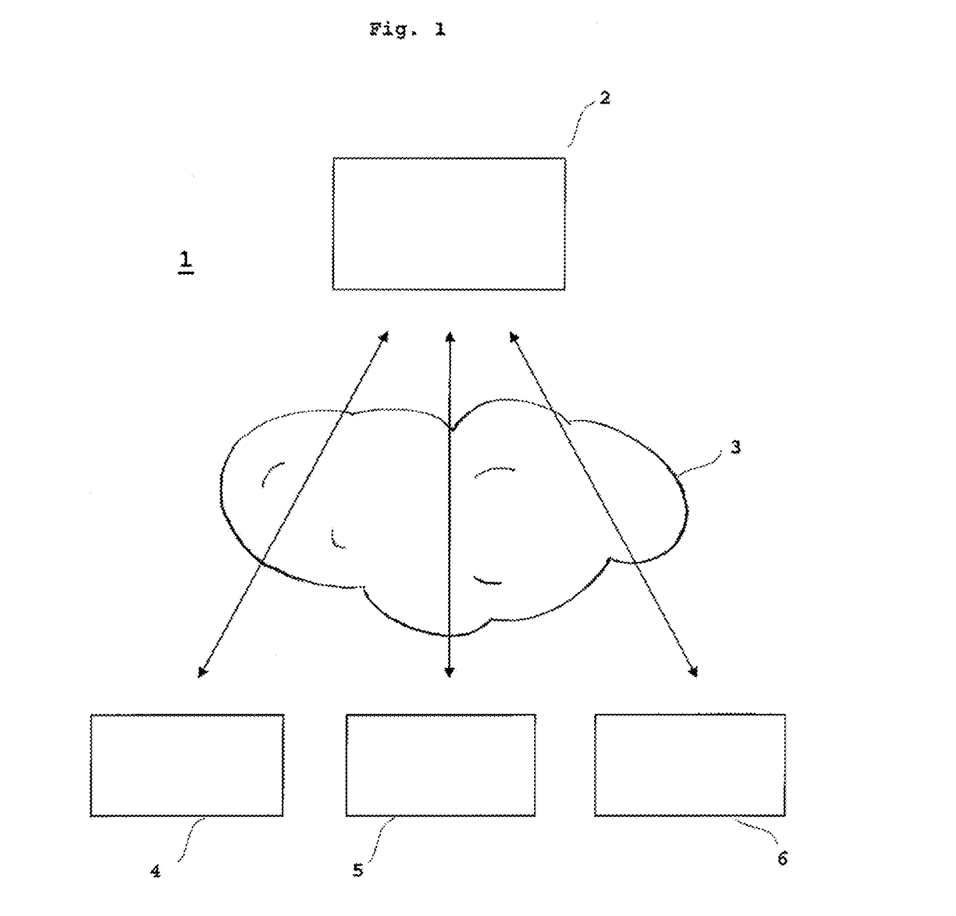
FIG. 1 is an overview over the entire structure of the system.

In FIG. 1 an overview over the entire system is given. The entire system 1 comprises a remote server 2 that is hosted by the manufacturer of the capsules. The server 2 is connected to the internet and is accessible via the internet from a remote location. Such a remote location is for example the home of a user who wants to use the services of the system. The personal apparatuses of the user may be connected to the server 2 via the internet 3. In the illustrated example such apparatuses are a beverage production machine 4, another device 5 and a user terminal 6. The other device 5 may for example be a weight scale for measuring the weight of a baby. The user terminal 6 can be any device that is capable of performing internet communication and in particular browsing a web side. All these apparatuses perform a communication via the internet by any known standard. In particular, the beverage production machine 4 and the other device 5 may perform a Wi-Fi communication with a router (not shown) that is installed in a home network and which is connected to the internet. The beverage production machine 4 and the other device 5 therefore are included in a home network. On the hand, the user terminal 6 may be integrated in the home network as well or may access the internet according to a mobile telecommunication standard. Of course, such mobile telecommunication standard might also be used by the beverage production machine 4 or the other device 5. But as such machines in most cases are not intended for mobile use integration into a home network only is preferred.

Figure 2:
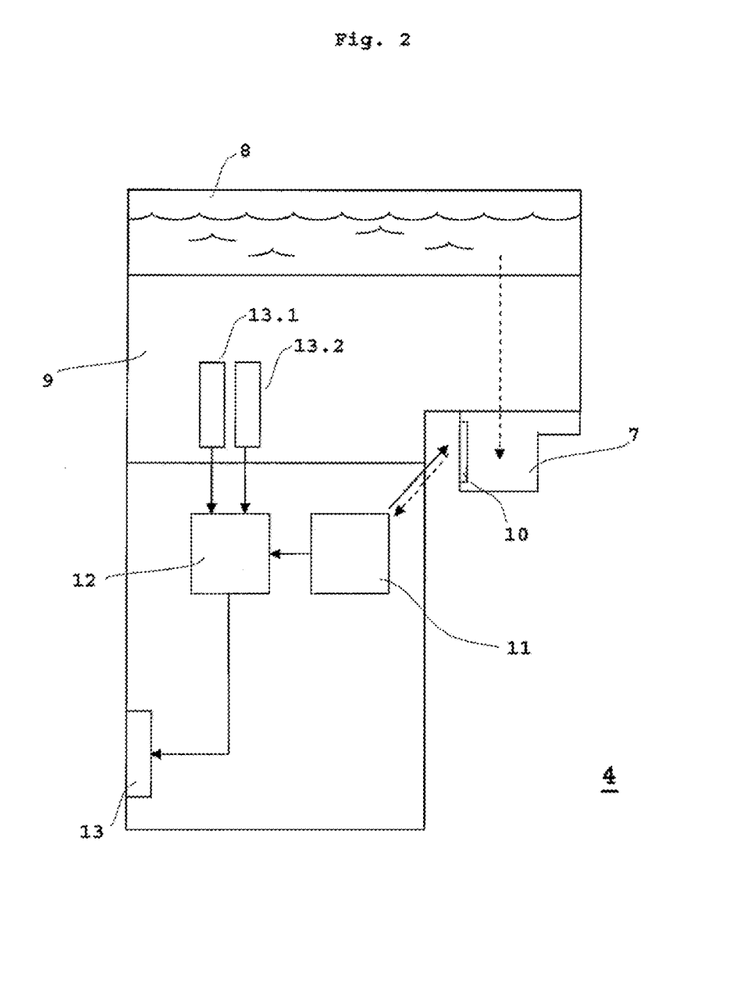
FIG. 2 is a block diagram of a beverage production machine for use in the system.

FIG. 2 shows the structure of the beverage production machine 4 in greater detail.

In order to produce an infant formula the beverage production machine 4 needs a capsule 7. In the capsule 7 there is contained a nutritional ingredient. The capsule 7 is inserted for example by means of a capsule holder into the beverage production machine 4. After the capsule 7 is inserted into the machine, the infant formula (being an example for a beverage) is produced by the machine. The beverage production machine 4 comprises a reservoir 8 in which a liquid is contained. Such liquid might be water, milk or the like. For further explanation it is assumed that the liquid is water that needs to be mixed with the nutritional ingredients in the capsule 7 in order to prepare the infant formula. Supplying the water to the nutritional ingredients of the capsule is achieved by means of a processing mechanism 9. The processing mechanism 9 is capable of heating the water to desired temperature, opening the capsule 7 and supplying the heated water to the capsule 7 with a defined flow rate. When the water is supplied to the capsule it will be mixed with the nutritional ingredients and the final product is then poured into a baby bottle or the like for example. For emptying the capsule an air pressure is applied by means of an air needle.

It is to be noted that different types of capsules 7 may be used in the same beverage production machine 4. For example, the type relates to the recommended range of the age of the infant, the capsule is designed for. For example, there could be six types of capsules, e.g., type 1 for first month, type 2 for second-month, type 3 for 3-6 months, type four for 7-12 months, types 5 for 13-24 month and type 6 for 25-35 months. These different types may have different tastes of the beverage to be produced and/or different amounts of the nutritional ingredients contained in the capsule 7 for example. Thus, the flow rate, the amount of water, the pressure and the temperature of the water need to be adjusted to the type of capsule 7 that is currently used.

In order to adjust the parameters for the production that are set by the processing mechanism 9 it is necessary to determine first what type of capsule 7 is currently inserted into the beverage production machine 4. The capsules 7 have information on the type provided on their surface which is in the illustrated embodiment a code, e.g., a barcode 10. The information on the barcode 10 is read by a barcode reader 11. To ensure that the barcode 10 can be read by the reader the capsule 7 is non-symmetric and thus, the barcode 10 which is located at a particular position on the capsule 7 is oriented always the same when the capsule 7 is inserted into the beverage production machine 4. The information of the type of capsule 7 that is used for the current preparation of a beverage is transmitted by the barcode reader 10 to a processing unit 12 which is connected to an internet unit 13. The internet unit may for example be a WI-FI module which is able to communicate with a router that is connected to a home network. Within the processing unit 12 the information received from the barcode reader 11 may either be sent directly to the remote server 2 or the information may be used to identify the type of the capsule 7 and transmit the identified type only. Of course, the code and reader can be other than a bar coding technology but can be: colour, shape or logo recognition, magnetic, electromagnetic, inductive, conductive or other similar identification technologies.

The beverage production machine 4 furthermore comprises sensors for monitoring internal parameters of the processing mechanism. Such parameters might be the temperature of the liquid that is achieved before the liquid is supplied to the capsule 7, the flow rate of the liquid into the capsule, the pressure at which the liquid is provided or the amount of liquid that is supplied during one cycle of preparation of the beverage. Of course, further internal parameters might be monitored. In the illustrated embodiment two different sensors 13.1 and 13.2 are shown, but it is self-explanatory that there might be as many sensors as necessary in order to monitor all relevant values of the processing mechanism 9. Internal parameters can also be events that are identified by the processing unit 12, for example switching off during use.

The detected values or electric signals corresponding to the detected values are transmitted from the sensors 13.1, 13.2 to the processing unit 12. The processing unit 12 then again transmits the result of the measurement of the sensors 13.1, 13.2 or information on a detected event to the server 2. The result of the measurement may either be the value measured by the sensor 13.1 or 13.2 itself or corresponding information. Furthermore, in order to avoid unnecessary data transferred from the beverage production machine 4 to the server 2 it is preferred that the values measured by the sensors 13.1 and 13.2 are analyzed in the processing unit 12. Such analysis may for example be a comparison between the measured value and a threshold that is stored in the processing unit 12. Only in case that the value exceeds or falls short of the respective threshold the result of the measurement is transmitted to the server 2. Of course, for some parameters that are monitored it seems preferable to transmit every value that is measured to the server. Alternatively, a time interval may be set and after such time interval has elapsed a parameter is measured and the result thereof is transmitted to the server 2. This gives the opportunity to monitor for example a decrease of performance.

Figure 3:
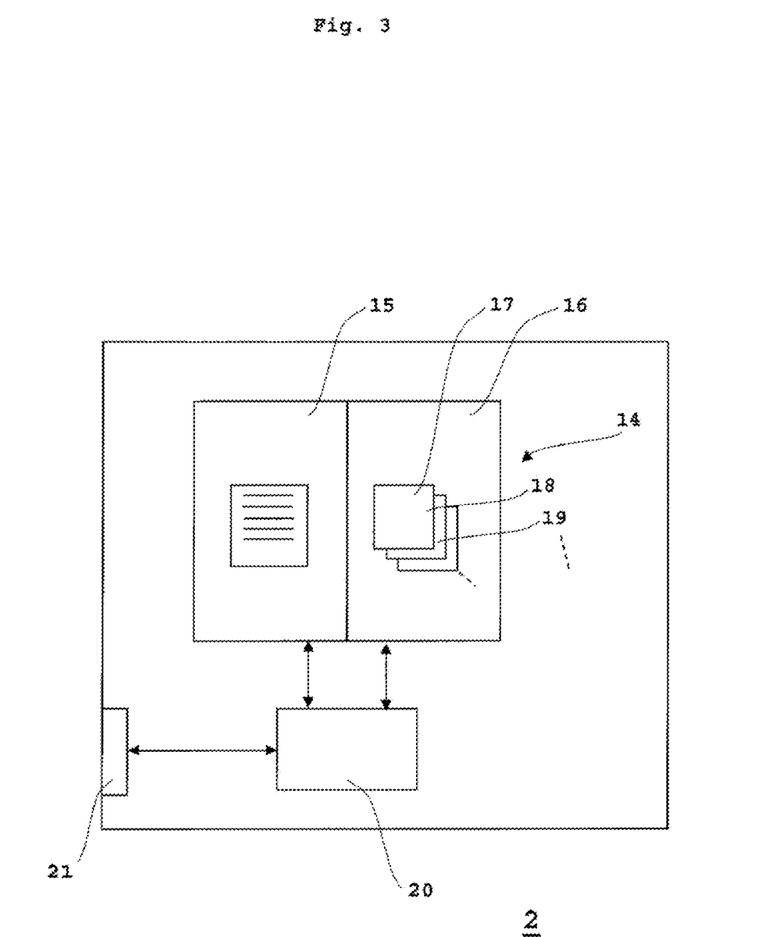
FIG. 3 is a block diagram of a server of the system.

FIG. 3 shows an example of a server 2 for use in the system and for the inventive method. The server 2 comprises a storage means 14 that is divided into two storage areas 15 and 16. In the first storage area 15 there is stored a table including the information on the different types of capsules 7. In particular, the information includes a definition of the nutritional ingredients that are contained in the capsule 7, the amount of the nutritional ingredient and the respective amount of the infant formula that is produced when using the capsule 7, the flavor of the infant formula and the recommended age of the baby for which consumption of the infant formula made from this particular type of capsule is recommended. In a second storage area 16 there are stored user accounts 17, 18, 19 etc. As it will be explained in the following, these different user accounts 17, 18, 19 all make use of the same table which is stored in the first storage area 15. Thus, an update of the table can be made easily and any recommendation or determination of replenishment is then based on the actual list of products that are available.

The storage means 14 is connected to a processing unit 20. By means of the processing unit 20 the information of the table stored in the first storage area is updated. This information is updated only internally (i.e. by the capsule manufacturer (supplier)) contrary to the user accounts 17 to 19 that may be updated by the users themselves. In order to make such an update to the user profile 17, 18 and 19 the processing unit 20 is connected to an interface 21 by which the server 2 is connected to the internet.

Figure 4:
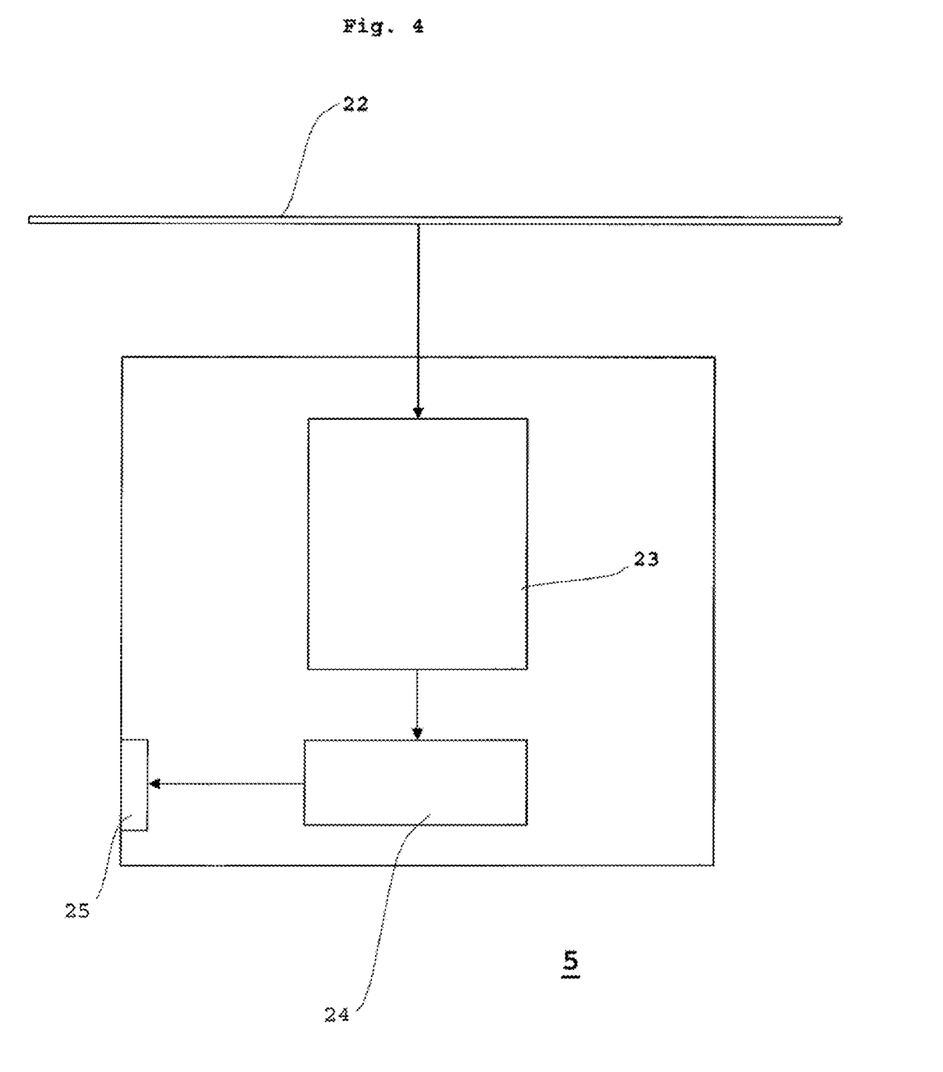
FIG. 4 is a block diagram of another device.

In FIG. 4 an example for another device 5 being a weight scale is illustrated. The weight scale includes a platform 22 on which the baby to be weighted is placed during measurement. The weight scale comprises a sensor 23 that is connected to a processing unit 24. When a baby is placed on the platform 22 the sensor 23 determines the weight and supplies a respective electronic signal to the processing unit 24. The processing unit 24 analyses the electric signal and transmits the weight of the baby via interface 25 to the server. Again the interface 25 preferably is capable of performing a WI-FI communication with a router of a home network.

When the processing units 12 or 24 of the beverage production machine 4 or the weight scale 5 transmit information to the server 2 the date and time at which this information was generated is preferably transmitted to the server 2 as well. In the case that information is transmitted to the server each time an event occurs like preparing a beverage using a capsule 7 or performing a measurement of the weight of the baby the date and time of the information corresponds to the transmitting time and thus the transmitting time may be used.

Although not illustrated for the weight scale here as well sensors may be included in the weight scale 5 in order to monitor internal parameters of the device 5 and results of such measurements may be transmitted to the server 2 as it was explained in greater detail with respect to the beverage production machine 4. To avoid unnecessary repetition it is referred to the information given above.

Figure 5:
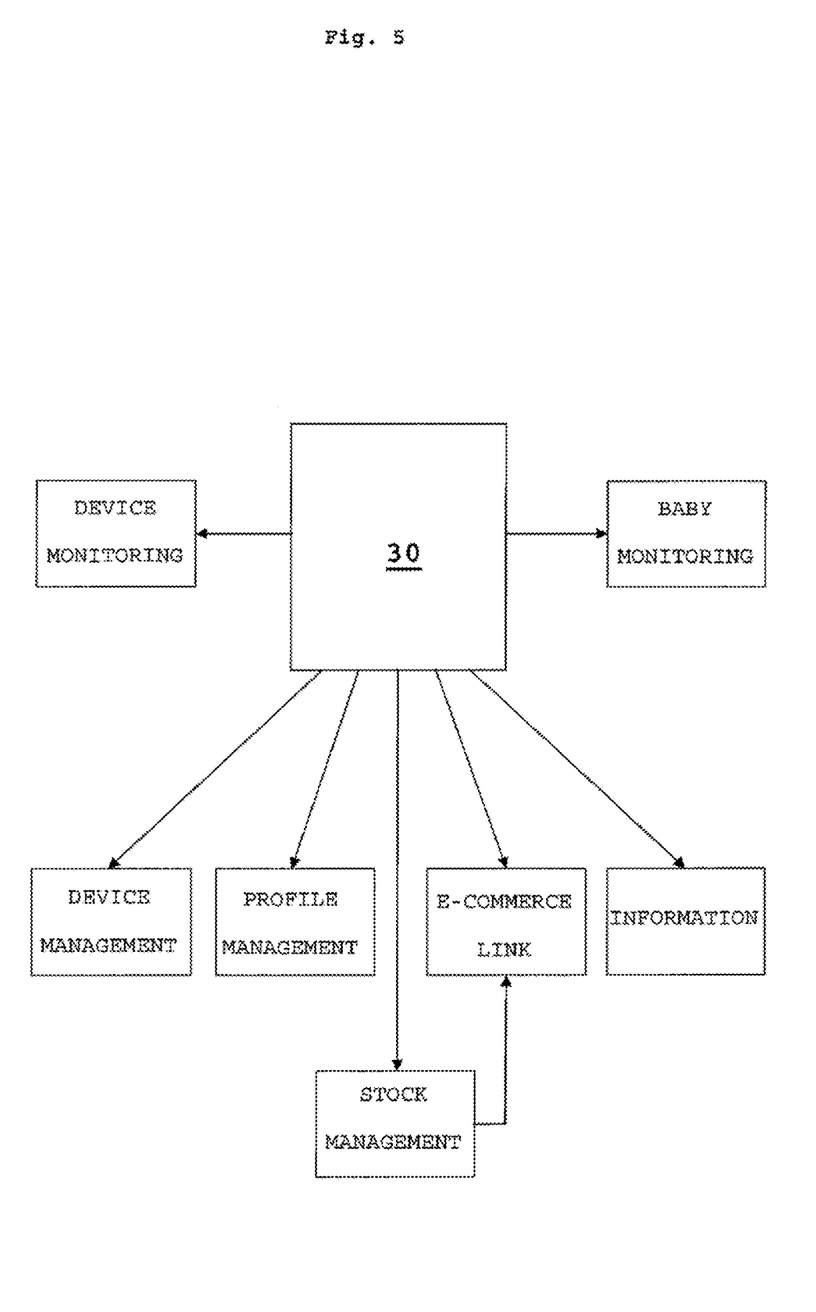
FIG. 5 is an illustration showing the association of the different information collected by the server.

In the following the use of all the information that is collected by the server and which is transmitted by the beverage production machine and/or other devices is explained referring to FIG. 5. When the user connects to the server 2 for the first time he enters the system by a web access and creates his account 30. Each user creates his own account 30 on a website that is presented by the user terminal 6. When the user creates his account 30 at first he enters information regarding the account holder like name, address, telephone number and the like. Furthermore he might include information regarding the desired payment mode in case that he would like to use the possibility of purchasing items and/or capsules via e-commerce or an internet shop.

After such user account 30 was created the user (account holder) may add one or more profiles of babies which are persons that consume the beverages produced by the beverage production machine 4. Besides information like the baby being male or female and for example the given name it is particularly important that an information is entered on the basis of which the current age of the baby maybe determined. Of course it is particularly preferred that the date of birth is entered into the system. Furthermore the profile can include information on allergies which might also be taken in consideration when a type of capsule is determined for replenishment.

In the user account 30 there may also be stored a plurality of user preferences. For example the account holder may select that he only would like to use the monitoring functions only (also explained later in detail) or that he would like to perform an automatic order when replenishment of the capsules 7 is needed or he would like to receive a notification that replenishment is needed. In the latter case he has the opportunity to decide by himself when an order is sent to the supplier.

After setting up the user account the user can register his beverage production machine 4 (or a plurality) and/or other devices 5 that shall be included in his home network to his account. Each of the beverage production machines 4 and the other devices has an exclusive MAC address which is used for registration and identification of any information that is sent to the server 2 so that any information and registration can be assigned to the correct user account. At first it is therefore necessary to integrate the beverage production machine 4 or the other device 5 to the user account. In order to do so at first the machine is switched on and is brought into a connection mode, for example the Wi-Fi mode. After that when the beverage production machine 4 or the other device 5 is prepared the user terminal is brought into its searching mode in order to look for Wi-Fi networks. The beverage production machine or the other device that is to be integrated into the system is then identified as own Wi-Fi network and is selected. After doing so the routine for further integrating the machine into the system is available on the homepage of the provider of the system.

When the beverage production machine 4 is integrated into the system it is connected to the server 2 at any time the home network is established. When being connected it is possible for the beverage production machine 4 (or any further registered device 5) to send information to server 2. All registered machines or devices of a user are assigned to his account. Consequently a device monitoring is possible on the basis of any information, internal and external parameters that are submitted from the machine or device to the server 2. On the other hand and on the basis of the information stored in the server 2 about the date of birth of the baby monitoring of the baby's development is possible. For example weight curves may be built and may easily be monitored with respect to an unusual development of the baby. In case an unusual development is detected an alert may be sent to the account holder. This may be done by an automatic email so that it is not necessary that the account holder actively logs in. For producing such weight curves the measurement results and date and time of measurement of the weight scale 5 are used. New devices that may be purchased at a later time may be included into the system in the same way as it was explained above and thus a device management for all registered devices 5/beverage production machines 4 is possible via the web access.

Furthermore account management is possible which means that the account holder may alter his personal data, add for example another baby profile with its personal data like date of birth, sex and name. General information for parents may also be given, for example information about a balanced diet, about status of the development of a baby, an average development of the weight and/or other growth related parameters over time.

Besides all these possibilities that are available for a user the central aspect is stock management for the capsules 7. As it was explained above the system has the information that a capsule of a particular type was used at a corresponding date and time. Thus, the number of capsules 7 that are still in stock of the user is decreased by one. When any use of the capsule 7 is recognized by the beverage production machine 4 and the respective information is transmitted to the server 2 and stored within the user account 30 an actual number of the remaining capsules 7 is always available. Preferably purchasing the capsules 7 is only possible using the user account 30 so that any purchase of capsules 7 will automatically update the number of capsules 7 that are in stock of the user.

In case that other sales channels are also available the user has the opportunity to enter a current status of his stock manually.

In case that the number of remaining capsules 7 falls under a threshold that might be set by user input the processing unit 20 of the server 2 identifies the demand for replenishment of capsules 7. Such a demand may either be communicated to the account holder or results in an automatic ordering procedure using an e-commerce link or link to an internet shop that is available through the same account 30 of the user. This e-commerce link is also directly accessible by the user in order to purchase for example further devices 5 like the weight scale.

Figure 6:
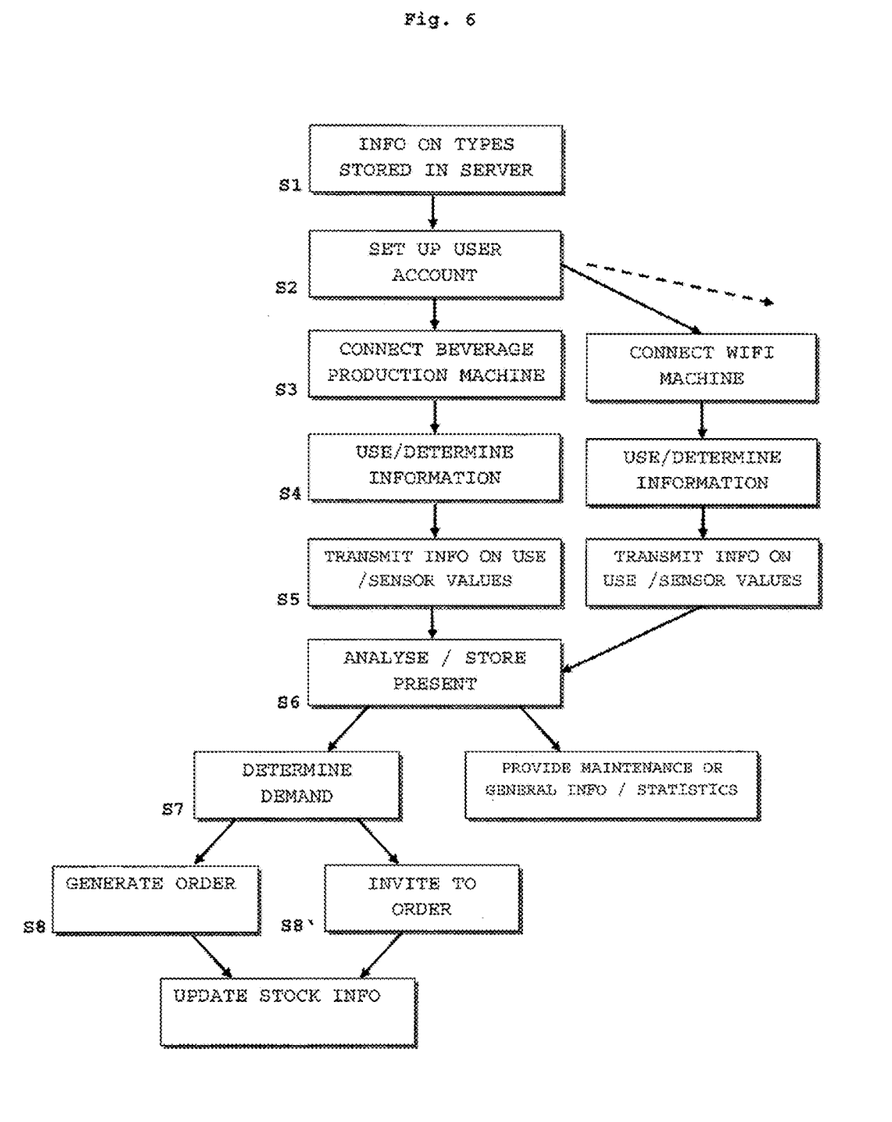
FIG. 6 is a simplified flow chart illustrating the method steps.

In FIG. 6 a flow chart of the method according to the invention is shown. At first information of the different types of capsules 7 that are available are stored in a first storage area 15 of the storage means 14 of server 2. Then a user account 30 is setup on the server in S2 including data of the account holder as well as the relevant data of at least one baby in a profile. After that in step S3 the beverage production machine 4 and/or the other device 5 is integrated into the system. For doing so the MAC address of the machine/device is registered in the user account 30 and a connection between the machine/device and the server 2 is established.

When such communication between the server 2 and the beverage production machine 4 or the other device 5 is possible these devices or machines may be used. During use and as it has been explained earlier information may be sent from the beverage production machine 4 or the other device 5 to the server. This information can be information about the type of used capsules 7 that was used together with date and time or information on an internal parameter including events that was detected inside the beverage production machine 4 or the weight scale as other device 7 or it may be the result of a measurement or an information according to such measurement that is transmitted for example by the weight scale. The transmission of such information is performed in step S5.

Inside the server 2 the processing unit 20 analyzes and/or stores the received data. Such analysis may for example be a comparison between the number of capsules 7 still in stock and a threshold that is predetermined. If it is determined by the analysis instep S6 that the remaining number of capsules 7 falls under a certain threshold the demand of capsules 7 is determined in S7. In order to determine the demand it is referred to the age of the baby and maybe other information of the baby's profile and the table stored in the first storage area 14. The demand may also be determined using a predictive consumption schedule which is determined on the past consumption of the baby and its age with or without pondering factors such as its health, weight or other growth or heath factors or specific pediatrician inputs. On the basis at least of the age it is then determined which types of capsules are reasonable to be purchased since these types of capsules 7 will be obviously used in the near future and should therefore match the current age of the baby. In case that there is a plurality of types of capsules, for example having different flavors, recommended for the same age the demand for the different types that are recommended for the same age may be for example equally distributed over the different flavors available. When an allergy of the baby is stored in the profile corresponding types of capsules are omitted when the replenishment information is generated.

Thus finally the determined demand includes information about a number of a particular type of capsules 7 (or a plurality of types) that need to be ordered as a replenishment. The replenishment may include a plurality of different types of capsules 7. After such demand has been identified and thus the replenishment is determined an order may be generated automatically as indicated in step S8 according to respective settings in the user preferences. Alternatively the account holder may receive a notification that an order is necessary for replenishment. This notification includes information about the determined replenishment such that the account holder in the end may for example only confirm and by confirming the determined replenishment an order will then automatically be issued.

The user may set up preferences in his account and in these preferences it is identified if an automatic ordering routine or a notification shall be issued.

Assumed that after step S8 or S8' the ordered amount of capsules was delivered the stock information is updated so that for the next analysis in step S6 the real number of currently in stock capsules 7 is available.

In step S10 maintenance information and/or statistics are be provided. As a result of the analysis for example the history of the consumption may be presented by the account holder. Furthermore necessary maintenance of the beverage production machine 4 or the other device 5 may be provided.

Examples of the information that is provided are given in FIGS. 7, 8, 9, 10, 11a, 11b.

Figure 7:
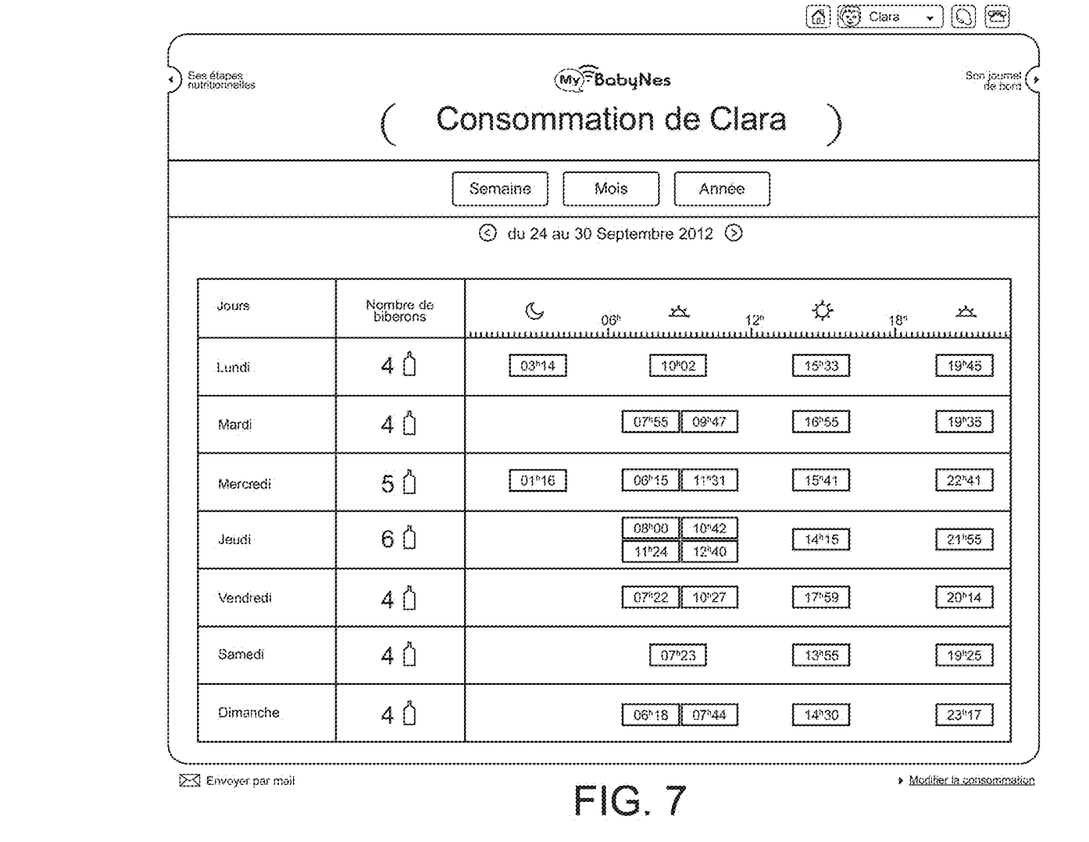
FIG. 7 is a calendar showing a consumption of beverages.
Figure 8:
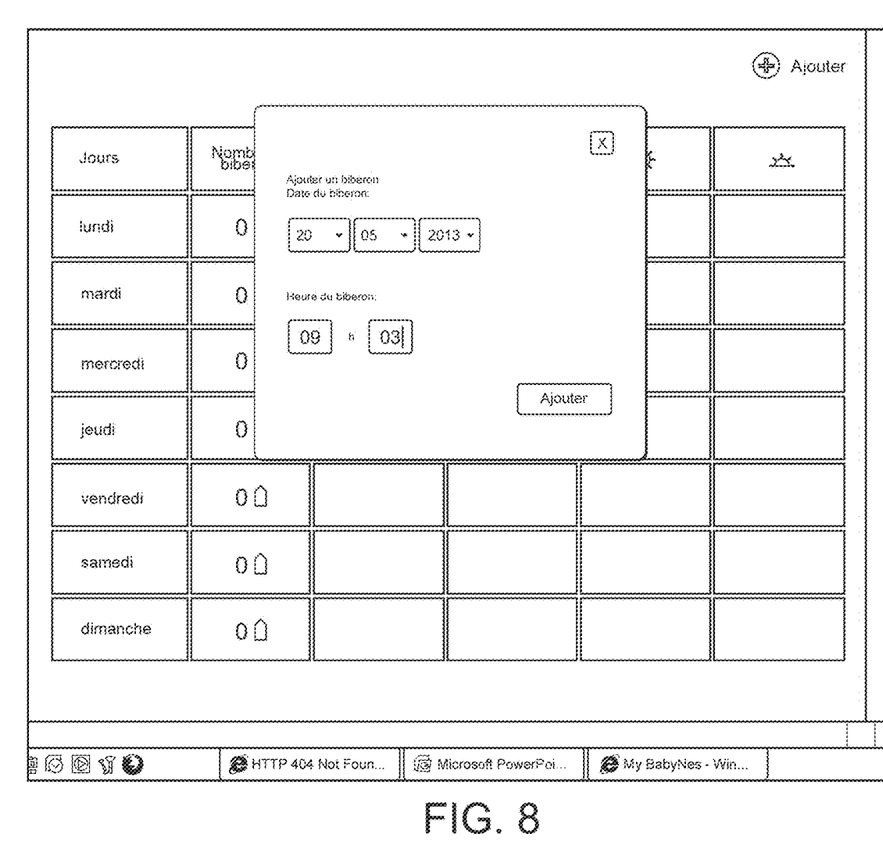
FIG. 8 is an example for a mask for manual input of data in the calendar.

After the user logged into his account on the website it is possible for him to visualize the consumption as shown in FIG. 7. Based on the information of the identified capsules 7 that is received by the server 2 and furthermore using the date and time also transmitted with the identification information a calendar is generated in which the number of meals is shown. In the illustrated embodiment the calendar is limited to one week, each day corresponding to one row. Separate columns are displayed for showing the exact time at which the infant formula was prepared. Columns are presented for night, morning, afternoon and evening. The calendar is presented upon operation of the respective link in a home menu of the account 30. Different time periods instead of week may be set for displaying the consumption.

Within the calendar there may be presented a warning if an abnormal consumption is determined. For example if for a particular day the recommended amount of infant formula could not be reached this day could be marked up in a different color.

The calendar can also provide information as from which type of capsule, the meal was prepared. For example, if the user clicks on the figure, day or time, this will open a new window showing the type of capsules consumed. For instance, the information will be that for the two meals on "Monday", the identified capsule was of a first-month capsule (type 1).

Figure 9:
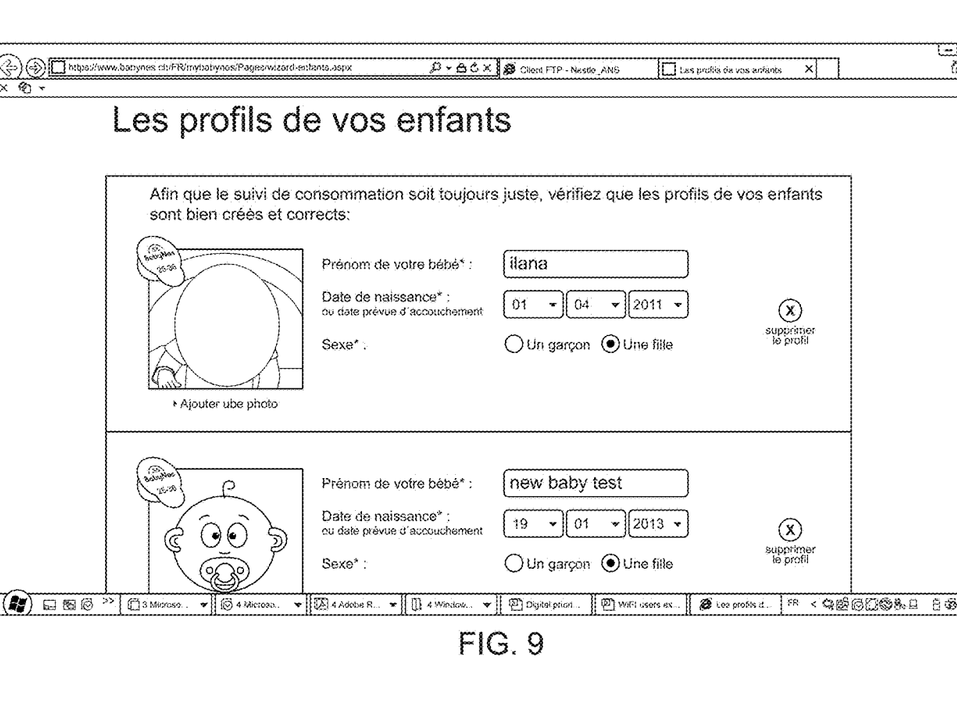
FIG. 9 shows the window for the user to fill in the profile his/her baby.

The calendar can be linked to the profile of the baby, such as his/her age, in the user account. It can be useful in particular, if a wrong capsule is used for the baby with an age not corresponding to the type of capsule. FIG. 9 shows an example of window for the user to input the profile of the baby. The feeding history would so remain available to the user or pediatrician accessing to the calendar. A warning signal such as a red or yellow dot may also appear on the calendar to inform the user of such a discrepancy.

Additional information may be provided such as the volume of the liquid supplied to the capsule in order to give the indication or information of the volume of beverage dispensed.

In some cases it may occur that not every time the baby is fed the respective information is transmitted to the server 2. This may for example be the case when a family is on holiday or the like. It may also be that the information does not reflect the true consumption of the baby. This may for example be the case when the baby refuses to drink the full or part of the prepared beverage. Nevertheless it is of course desirable that the statistics do show the real beverage consumption, such as any meal the baby had, and therefore it is possible to enter additional meals of the baby manually or, on the contrary to subtract meals that would not be properly consumed by the baby. A mask is provided which allows entry of data corresponding to the information regarding the type of capsule usually transmitted by the beverage production machine 4. An example of which mask is given in FIG. 8.

It is furthermore possible that not only the user is capable of accessing the data that are stored under his user account but that these data is also supplied to the pediatric for example when it has immediately the calendar of consumption available for his/her diagnostics.

Furthermore it is to be noted that instead of browsing a web site provided by the server it is also possible to use an app providing the same functionality and running on an iOs, android or the other operating system of a smart phone.

Figure 10:
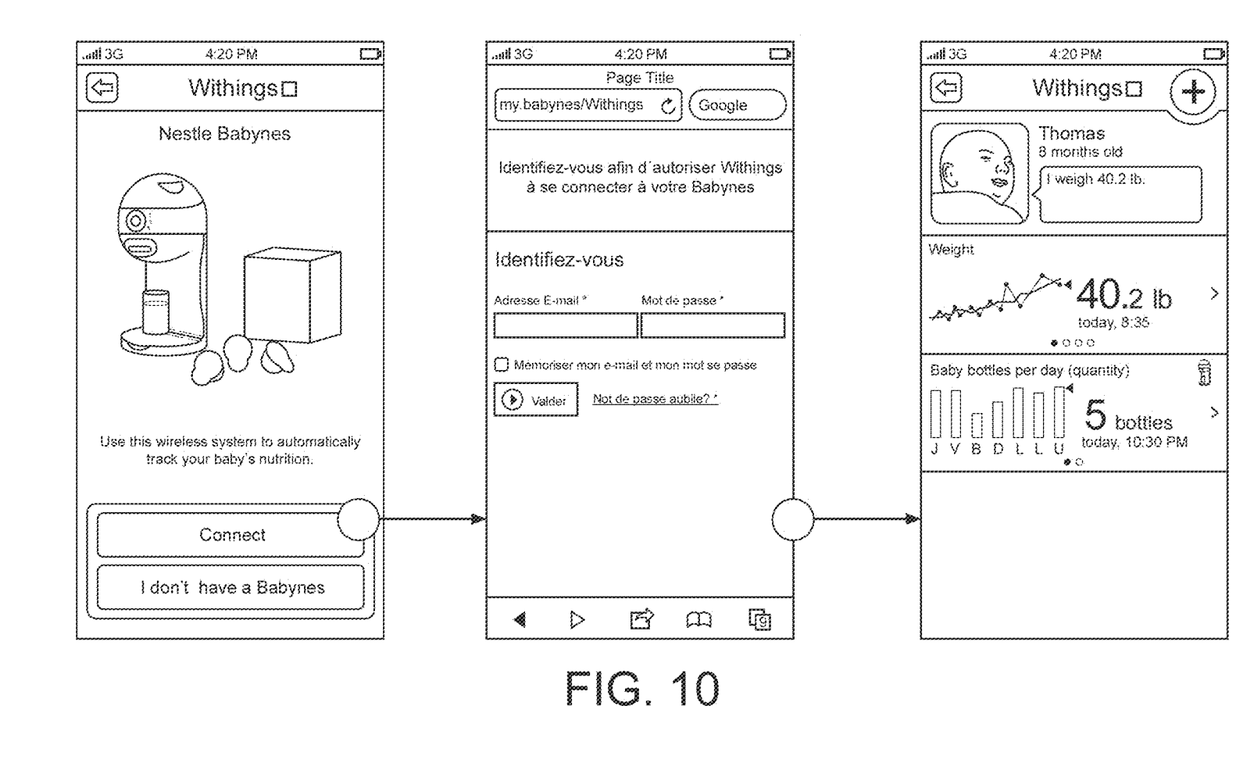
FIG. 10 shows an example for an app viewable on the screen of a smart phone or tablet.

For example, FIG. 10 shows different screen shots for an app designed for a mobile or smart phone. In the first screen, the user is invited to connect to the network or to create an account. In the second screen, the user is invited to identify himself/herself. In the next screen, a profile of a (e.g. male) baby is presented as well as his weight growing curve and his consumption for the day.

The invention claimed is:

1. A method for determining the consumption by an infant of beverages produced from capsules in a beverage production machine, the method comprising:
   registering and assigning the beverage production machine to at least one user account;
   storing in a server via a network the at least one user account including personal information about the infant consuming the beverages produced from the capsules;
   producing the beverages from the capsules and identifying each capsule used by the beverage production machine;
   each time one of the beverages is produced from one of the capsules, (i) transmitting to the server information on the identified capsule including at least one time-related information comprising a date and a time when the capsule is identified by the beverage production machine and (ii) storing the information in a storage of the beverage production machine when the server and/or the network is unavailable and delaying transmitting the information until the server and the network are available; and
   making the consumption of the beverages based on the information available in at least one application via a communication network on a user terminal by generating a calendar showing the consumption of the beverages and making the calendar viewable by a user, the calendar shows a number of meals corresponding to a number of the capsules identified, the at least one time-related information comprising the date and the time at which an infant formula was prepared in the beverage production machine, and a type of the capsule from which the infant formula was prepared, and allowing manual entry of data related to consumed meals and the type of the capsule.

2. The method according to claim 1, wherein the at least one time-related information corresponds to a transmitting time to the server.

3. The method according to claim 1, wherein the information includes the type of the capsule identified to the server.

4. The method according to claim 1, wherein the at least one user account is accessed by a consumer terminal connected to the server via Internet and/or a telecom network.

5. The method according to claim 1, wherein the user terminal is an internet-linked and/or telecom terminal.

6. The method according to claim 1, wherein the at least one application is configured to present a warning if an abnormal consumption is determined.

7. A system for determining the consumption by an infant of a beverage produced from a capsule in a beverage production machine, the system comprising:
   a remote server comprising a first storage for storing via a network a user profile including personal information about the infant consuming the beverage produced from the capsule and capsule information for a type of the capsule, the remote server configured to generate an application on the consumption of the beverage based on information available via a communication network on a user terminal; and
   the beverage production machine including a member for producing the beverage from the capsule and identifying the type of the capsule and a transmitter for transmitting to the remote server information including the date and time when the capsule is identified by the beverage production machine,
   when the beverage is produced from the capsule, the beverage production machine (i) transmitting the information from the beverage production machine to the remote server and (ii) storing the information in a second storage of the beverage production machine when the remote server and/or the network is unavailable and delaying transmitting the information until the remote server and the network are available,
   the remote server generating a calendar showing the consumption of the beverages and making the calendar viewable by a user, the calendar showing a number of meals corresponding to a number of the capsules identified, the at least one time-related information comprising a date and time at which an infant formula was prepared in the beverage production machine, and a type of the capsule from which the infant formula was prepared, and the application allowing manual entry of data related to consumed meals and the type of the capsule.

8. The system according to claim 7, wherein the capsule has a code having information related to the type of the capsule, and the beverage production machine comprises a reader to identify and transmit the type of the capsule used for current preparation of the beverage to a processing unit connected to an internet unit of the beverage production machine.

9. The system according to claim 7, wherein the beverage production machine is connected to the remote server via internet.

10. The system according to claim 9, wherein the beverage production machine further comprises a WI-FI module capable of performing a WI-FI communication with a router of a home network.

* * * * *